United States Patent
Maes (10) Patent No.: US 7,172,105 B2
(45) Date of Patent: Feb. 6, 2007

(54) APPARATUS FOR POSITIONING PIPE AND TUBING

(75) Inventor: Roger V. Maes, Lakewood, CO (US)

(73) Assignee: Amaesing Tools Mfg. Inc., Conifer, CO (US)

( * ) Notice: Subject to any disclaimer, the term of this patent is extended or adjusted under 35 U.S.C. 154(b) by 123 days.

(21) Appl. No.: 10/817,696

(22) Filed: Apr. 1, 2004

(65) Prior Publication Data

US 2005/0218189 A1    Oct. 6, 2005

(51) Int. Cl.
B23K 1/14    (2006.01)
B23K 37/04   (2006.01)
F16M 11/00   (2006.01)

(52) U.S. Cl. ............... 228/49.2; 228/47.1; 228/49.1; 248/123.11; 248/123.2

(58) Field of Classification Search ............ None
See application file for complete search history.

(56) References Cited

U.S. PATENT DOCUMENTS

| | | | | |
|---|---|---|---|---|
| 1,749,258 A | * | 3/1930 | Orcutt et al. | 451/150 |
| 1,999,197 A | * | 4/1935 | Schauer et al. | 408/235 |
| 2,042,720 A | * | 6/1936 | Lindner | 408/88 |
| 2,956,482 A | * | 10/1960 | Olton | 409/211 |
| 3,211,887 A | | 10/1965 | Cotterman | 219/126 |
| 3,492,847 A | * | 2/1970 | Mechetner et al. | 72/20.1 |
| 3,699,639 A | * | 10/1972 | Ditto et al. | 228/113 |
| 3,723,696 A | * | 3/1973 | McCall | 219/73 |
| 3,772,753 A | | 11/1973 | Sargeant | 29/200 |
| 3,777,967 A | * | 12/1973 | Searle et al. | 228/2.1 |
| 3,913,820 A | | 10/1975 | Valentine | 228/25 |
| 4,058,025 A | * | 11/1977 | Wood | 74/571.11 |
| 4,265,789 A | * | 5/1981 | Christopherson et al. | 252/511 |
| 4,274,309 A | | 6/1981 | Lenker | 76/114 |
| 4,541,621 A | | 9/1985 | Amos | 269/51 |
| 4,768,918 A | * | 9/1988 | Gorman et al. | 414/719 |
| 4,943,020 A | * | 7/1990 | Beaucoup et al. | 248/124.2 |
| 5,213,292 A | * | 5/1993 | Evans | 248/123.11 |
| 5,265,789 A | * | 11/1993 | Adams | 228/49.3 |
| 6,027,093 A | * | 2/2000 | Reiher | 248/451 |
| 6,129,319 A | * | 10/2000 | Metelski | 248/123.2 |
| 6,921,056 B2 | * | 7/2005 | Holung | 248/280.11 |
| 2004/0051222 A1 | * | 3/2004 | Cattell | 269/71 |

FOREIGN PATENT DOCUMENTS

JP    6-269994    9/1994

* cited by examiner

*Primary Examiner*—Lynne R. Edmondson
(74) *Attorney, Agent, or Firm*—Innovation Law Group, Ltd.; Jacques M. Dulin, Esq.

(57) ABSTRACT

A counterweight assembly is especially adapted for mounting to a spinner tool allowing a workpiece to be balanced when rotated during welding or other operations. The counterweight assembly has an adjustable counterweight to provide a necessary amount of counterbalance force depending upon the particular size and configuration of the workpiece. The spinner tool is adapted to secure various diameters of pipe as well as pipe flanges. The spinner tool can be mounted within a portable vise that can be used directly at a work site.

12 Claims, 8 Drawing Sheets

APPARATUS FOR POSITIONING PIPE AND TUBING

FIELD OF THE INVENTION

The present invention relates to an apparatus for positioning pipe, tubing, or other elongate workpieces that must be welded, and more particularly, to a counterweight apparatus for improved manipulation of pipe to be welded.

BACKGROUND OF THE INVENTION

Pipe welding fixtures or mounts used to secure a length of pipe so that the pipe may be manipulated during welding are well known. Particularly in welding, it is desirable for a welder to have the capability to apply a weld so that the welder's torch is placed on top of the joint to be welded, and then to rotate the workpiece around the position of the torch. If a welder is required to physically move the torch around the curved surface of the pipe, this greatly increases the difficulty for the welder to produce a consistent bead. Additionally, requiring the torch to be moved also greatly increases the time in which it takes to produce the weld, and raises safety concerns when a welder's helper or apprentice must hold the section of pipe being welded.

One common device used to rotate a workpiece during welding is a spinner tool that secures the workpiece, and enables the welder to rotate the workpiece by use of a wheel or handle that spins the workpiece about an axis of rotation. However, a welder must often join various sections of pipe wherein one section has an offset created by a 90° bend in the section of pipe. Since such a pipe section is not centered about the axis of rotation, the spinner tool is difficult to manipulate because the section of pipe is imbalanced.

One reference that addresses this weight imbalance problem is the U.S. Pat. No. 5,265,789 directed to a pipe welding counterweight support apparatus. The apparatus includes a support pipe having a counterweight slidably mounted therealong. The support pipe has a v-shaped lock that receives the pipe to be welded. A clamp chain is used to secure the pipe to the v-shaped lock.

Another reference that provides a solution for an imbalanced pipe section to be welded is found in U.S. Pat. No. 4,058,025. This reference discloses a counterweight assembly including a weight carriage having a frame that attaches to the pipe, and an adjusting assembly allowing the counterweight assembly to vary the amount of counterweight to be provided.

Although the prior art may be adequate for its intended purposes, one disadvantage suffered by the prior art is that many counterweight devices are structurally complex, and are difficult to install on the pipe to be welded. Additionally, the prior art suffers in that the counterweight devices are not adapted for use with a common spinner tool.

Therefore, it is one object of the present invention to provide an improved counterweight assembly that is simple in construction, yet provides a welder with an effective means to selectively vary a counterweight used to balance a workpiece so that it may be rotated in a safe and efficient manner.

It is another object of the invention to provide a counterweight assembly that may be used in combination with a spinner tool that is mounted to a portable vise found at the work site, thereby eliminating the need to mount the spinner tool and counterweight assembly to a worktable or other support remote from the work site.

SUMMARY OF THE INVENTION

In accordance with the present invention, a counterweight assembly is provided that may be directly mounted to an existing spinner tool. The present invention may be considered as a counterweight assembly alone, and a combination of the counterweight assembly and a spinner tool.

The spinner tool combination of the present invention includes a spinner tool having a support member in the form of a tube or pipe that is concentrically mounted within an outer sleeve, also made of a tubular member or pipe. A handle, preferably in the form of a wheel, is attached to one end of the support member. One or more sets of bearings are mounted between the support member and outer sleeve, thereby allowing the support member to easily spin or rotate within the outer sleeve when a user grasps and rotates the wheel. The counterweight assembly has a frame that is releasably secured to the support member adjacent the wheel. The counterweight assembly can be angularly oriented with a workpiece mounted to the spinner tool. A slidable counterweight mounts to the frame and is linearly adjustable to create a desired magnitude of counterweight to be applied. Preferably, the counterweight includes a pair of parallel spaced bars that are slidable through the frame and secured to the frame by a locking member, such as a screw or pin. Individual weights may be attached to the slidable counterweight to further add capability for counterbalancing a particularly large workpiece.

The spinner tool is especially adapted for receiving various diameters of pipe by a threaded well having sections of different diameters. Additionally, the wheel of the spinner tool is especially adapted for securing a pipe flange.

These and other advantages of the invention will become apparent from a review of the following detailed description taken in conjunction with the accompanying drawings.

DETAILED DESCRIPTION

Figure 1:
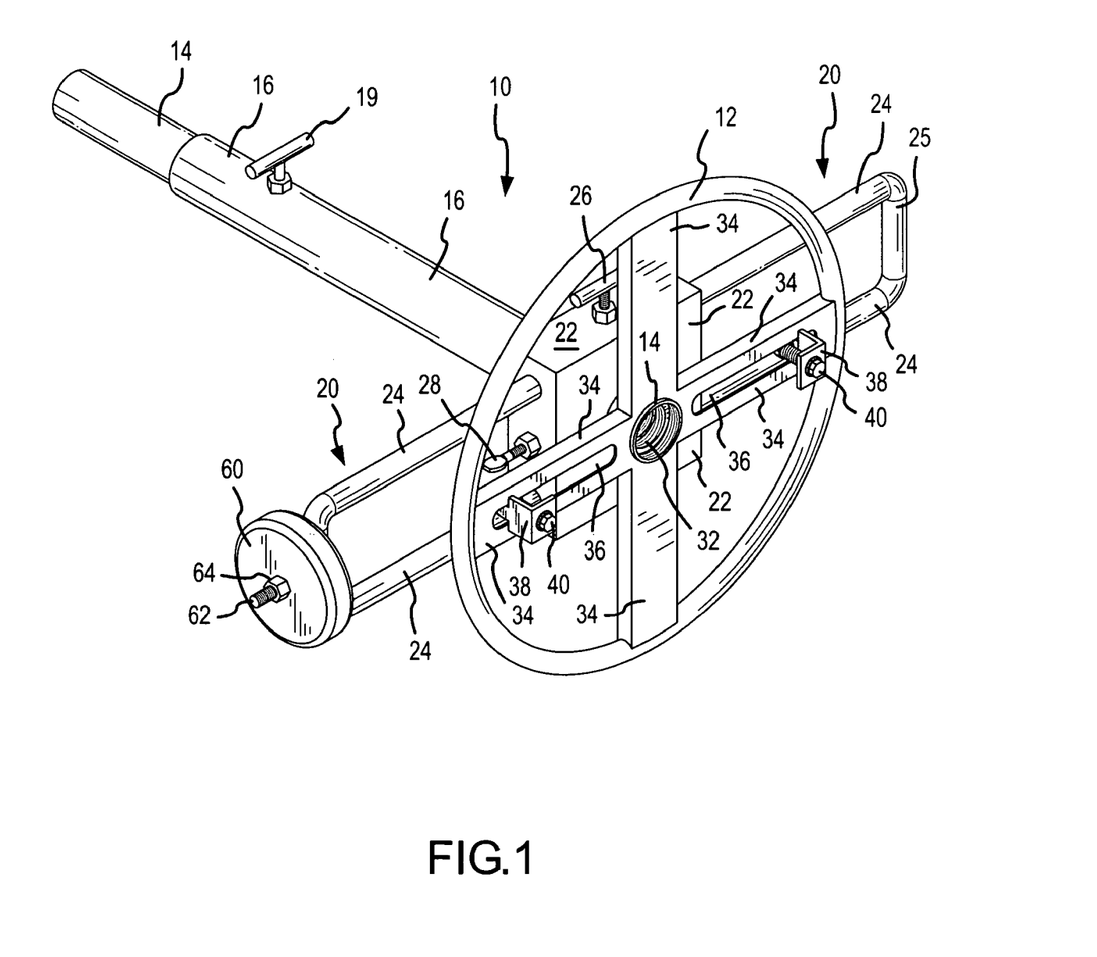
FIG. 1 is a perspective view of the spinner tool and counterweight assembly combination of the present invention.
Figure 3:
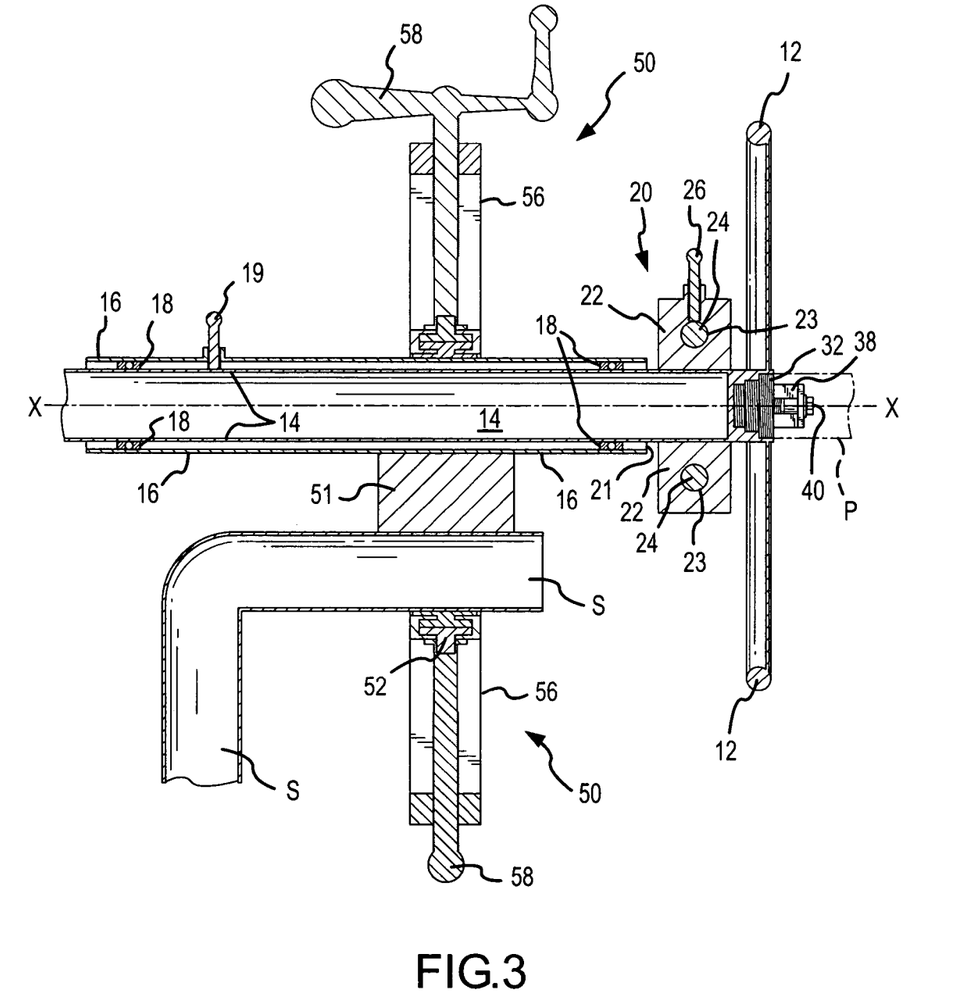
FIG. 3 is a vertical cross-section taken along line 3—3 of FIG. 2.

Referring to FIG. 1, the present invention is illustrated that in one aspect may be considered as a combination of a spinner tool and a counterweight assembly. In another aspect of the invention, it may be considered as only a counterweight assembly that can be used with various other types of tools used to secure pipe during welding. The combination 10 more specifically includes a spinner tool having an inner support member 14 that is mounted within an outer sleeve 16. Referring also to FIG. 3, one or more sets of bearings 18 are mounted between the support member 14 and outer sleeve 16, thereby allowing the inner support member to easily spin or rotate within the outer sleeve. A positioning wheel 12 is rigidly mounted to one end of the support member 14. To prevent the support member 14 from spinning within the outer sleeve 16, a securing pin or screw 19 is provided as shown.

Figure 4:
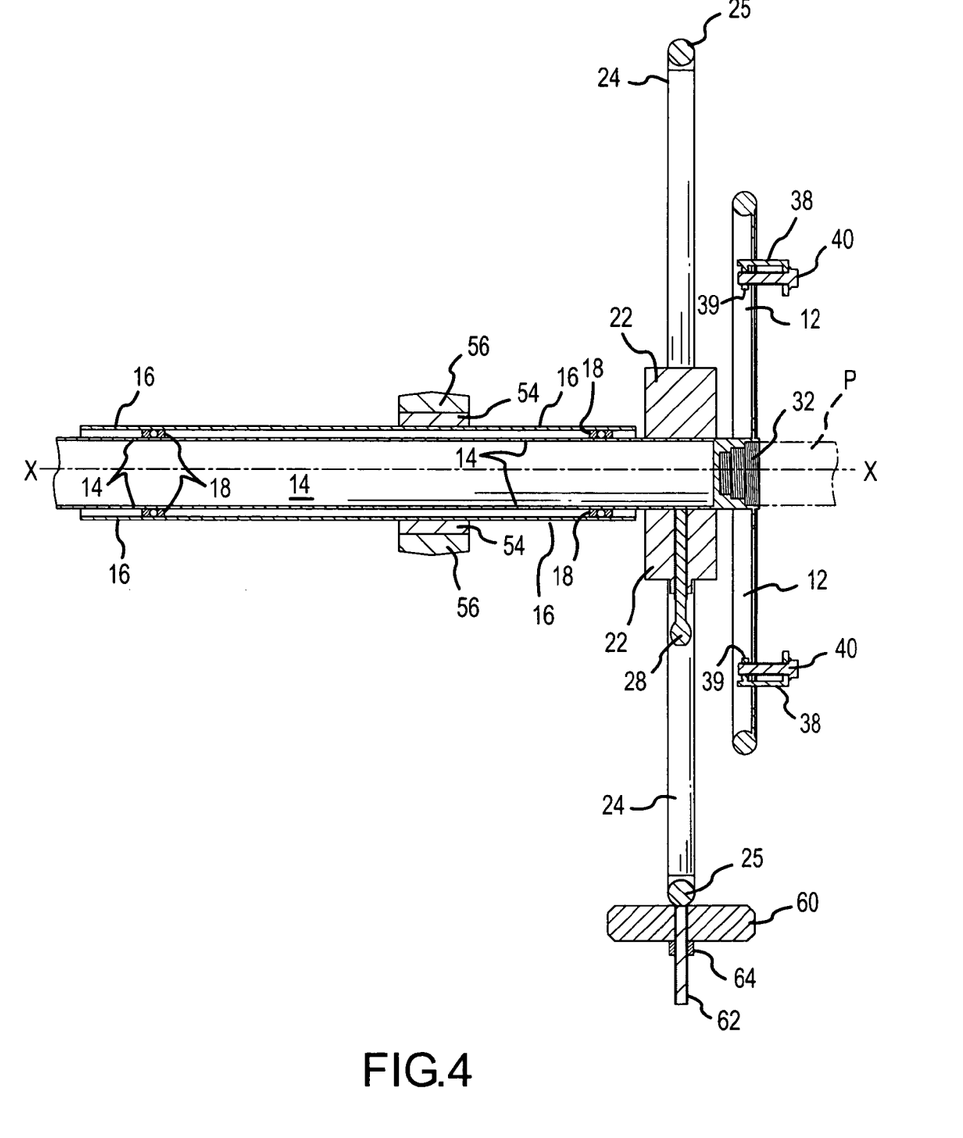
FIG. 4 is a horizontal cross-section taken along line 4—4 of FIG. 2.

The counterweight assembly 20 of the present invention includes a frame 22 that is mounted over the inner support member 14 between the wheel 12 and the adjacent end 21 (see FIG. 3) of outer sleeve 16. A slidable counterweight 24 is slidably mounted to the frame 22. The slidable counterweight 24 is characterized by a pair of parallel spaced tubular members that are received through corresponding openings 23 formed in the frame 22. The pair of spaced tubular members may be joined to one another at their respective ends by interconnecting pieces 25. Optionally, one end of the counterweight assembly may include a means to secure additional weight to the counterweight assembly. As shown in FIG. 1, additional weight such as weight element 60 may be secured to the counterweight assembly by a mounting screw 62 attached to piece 25 (see FIG. 4). Weight 60 has an opening to receive screw 62. Nut 64 then secures the weight 60 to the screw 62. One or more weights 60 may be added to provide the necessary counterweight. Counterbalance pin 26 is used to lock the linear position of the slidable counterweight 24 with respect to frame 22. The counterbalance assembly may be locked to the inner support member 14 as by securing pin 28, best seen in FIGS. 1 and 4.

Figure 2:
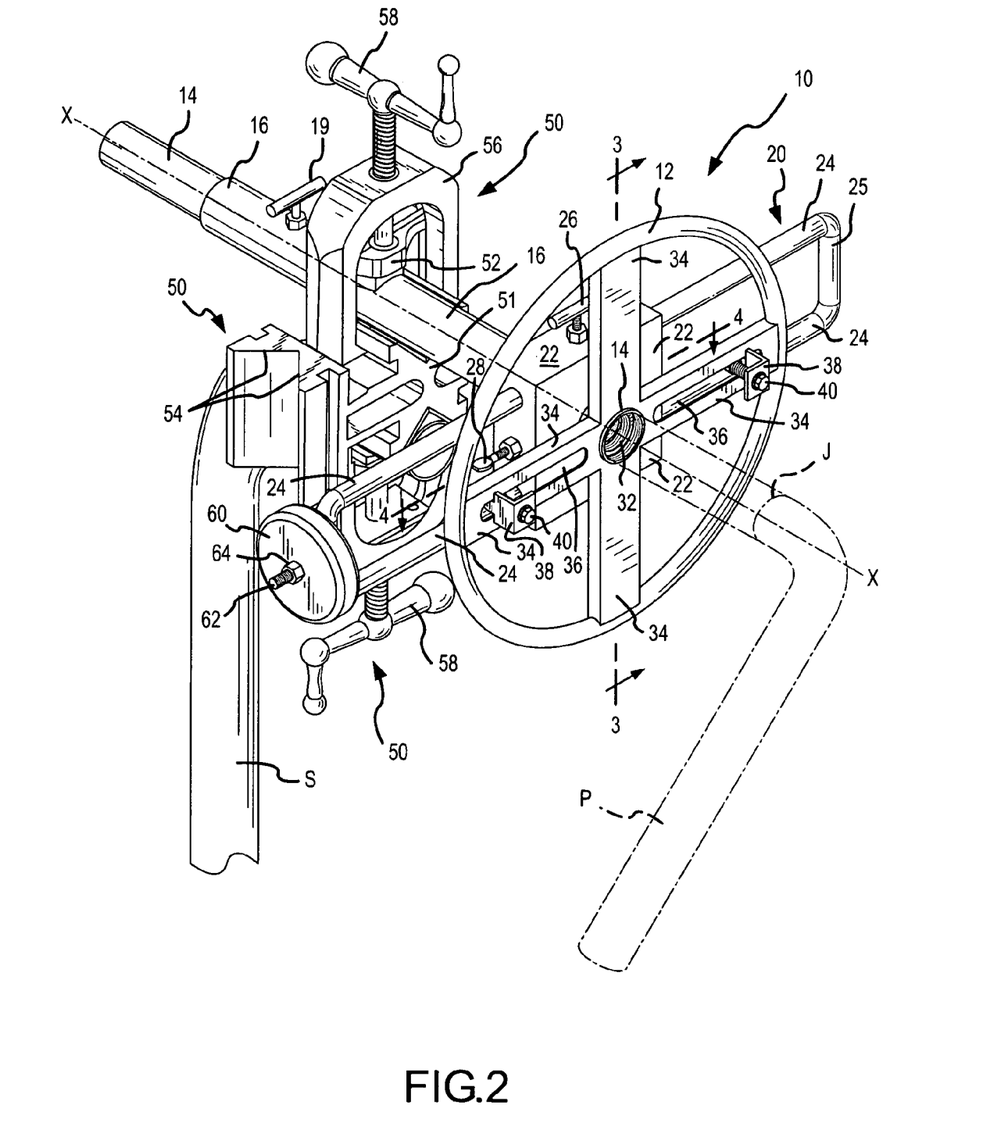
FIG. 2 is another perspective view showing the spinner tool mounted to a portable vise, and a section of pipe mounted to the tool.

Sets of internal threads may be formed within the well 32 located at the end of support member 14, as best seen in FIGS. 2 and 3. These sets of threads may be sized to accept common diameters of pipe, such as one inch, one and a half inch, and two inch pipe. The wheel 12 includes a plurality of spokes 34 and an attachment means allowing a pipe flange to be attached directly to the wheel. The attachment means is defined by a pair of slots 36 that are formed in a pair of opposing spokes 34, and a pair of securing brackets 38 secured in the slots. The brackets 38 are slidable within slots 36 and may be locked in place as by respective securing bolts 40 (see FIG. 4). Each bracket 38 includes a threaded tab 39 that receives the corresponding bolt 40 thereby allowing the bolt when tightened to lock the bracket in place.

The device 10 is conveniently mountable to a portable vise 50. The portable vise 50 corresponds to the vise shown and described in my copending application Ser. No. 10/773, 781, entitled "Portable Vise", this application being hereby incorporated by reference herein. The portable vise 50 is characterized by a base or body 51 having a plurality of v-shaped stationary jaws or engaging surfaces 54. To secure an object, a clamp assembly 56 is mounted over a corresponding set of engaging surfaces 54. In FIG. 2, one clamp 56 is mounted over a pair of engaging surfaces that secure outer sleeve 16, and another clamp 56 is mounted over the set of engaging surfaces that secure a horizontally extending handrail or stanchion S. A handle 58 of each clamp 56 allows a user to move a movable jaw 52 to contact the object to be held by the vise.

Figure 5:
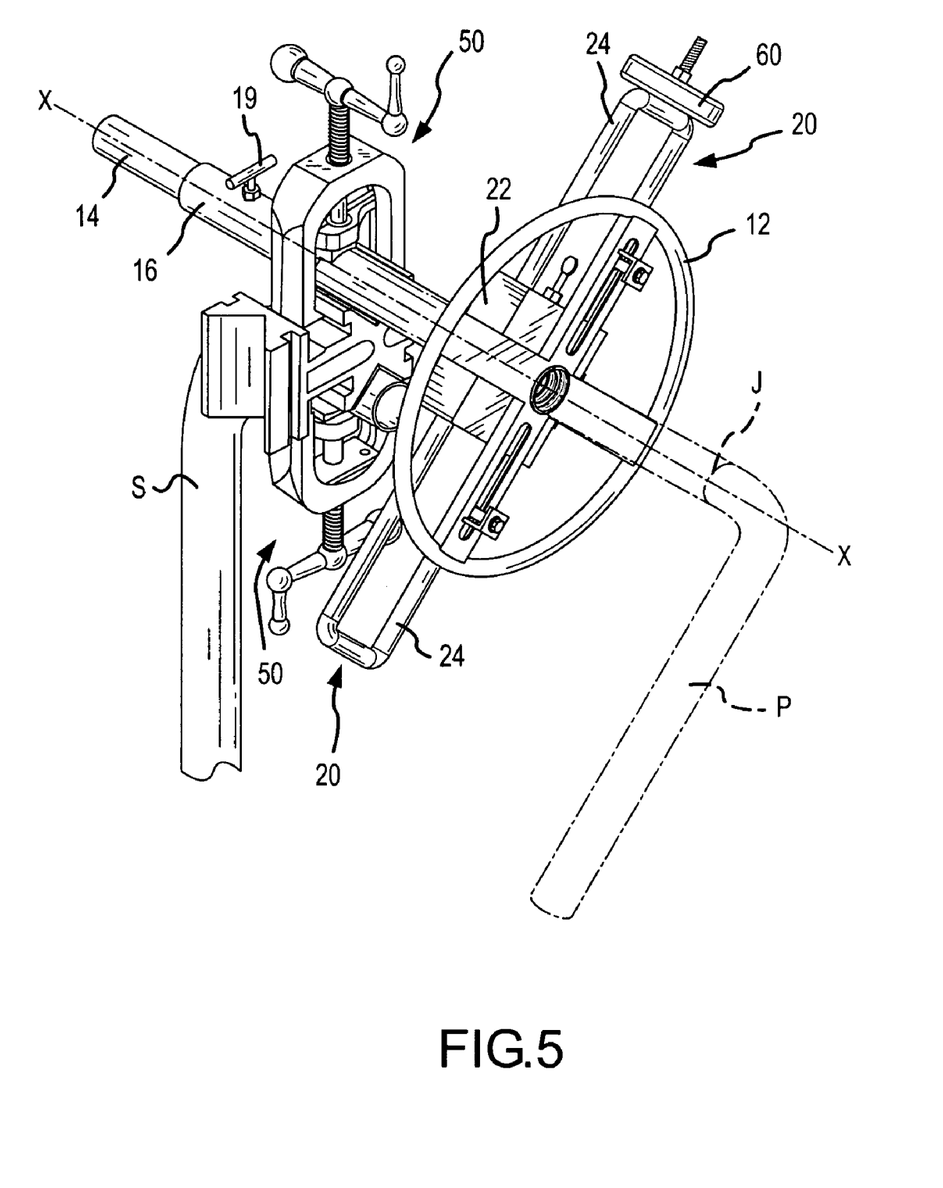
FIG. 5 is another perspective view showing the counterweight assembly positioned to counter balance the section of pipe.
Figure 6:
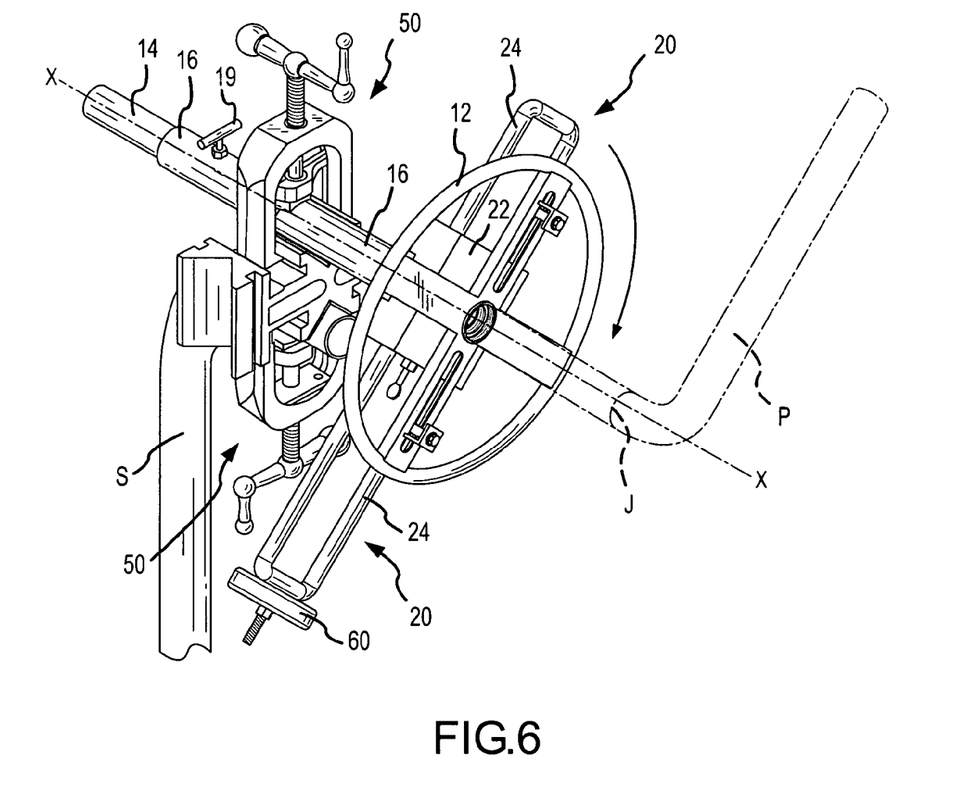
FIG. 6 illustrates the section of pipe being rotated about an axis of rotation.

The operation of the invention will now be described referring first to FIG. 2 where a section of pipe P to be welded has one end received within the threaded weld 32. The particular area of the pipe to be welded is designated as joint J. Thus, it is desirable to rotate the pipe around axis x—x thereby enabling a welder to keep a welding torch in a stationary position. Previously, a tack weld may have been applied to temporarily secure the adjoining sections of pipe at joint J. When the pipe P is first secured, it is preferable to tighten/lock the pin 19 so that the tool will not rotate. The counterweight assembly must then be angularly oriented so that the slidable counterweight can counterbalance the offset end of the pipe. Accordingly, securing pin 28 would be loosened and the counterweight assembly 20 would be rotated about support 14 so that the slidable counterweight 24 extends in the same plane but the opposite direction as the offset end of the pipe P, as shown in FIG. 5. Securing pin 28 is then tightened to prevent further rotation of the counterweight assembly. Next, the slidable counterweight 24 is adjusted to provide the desired amount of counterweight by loosening counterbalance pin 26, and sliding the counterweight 24 through frame 22. FIG. 6 shows the counterweight 24 being shifted to properly counterbalance the pipe P. A user could then spin the wheel 12 by loosening pin 19 to determine if the proper counterbalance had been achieved. As necessary, the user could make fine adjustments by further sliding the counterweight 24 to achieve balance. For particularly heavy sections of pipe P, it may be necessary to add one or more weights 60.

Figure 7:
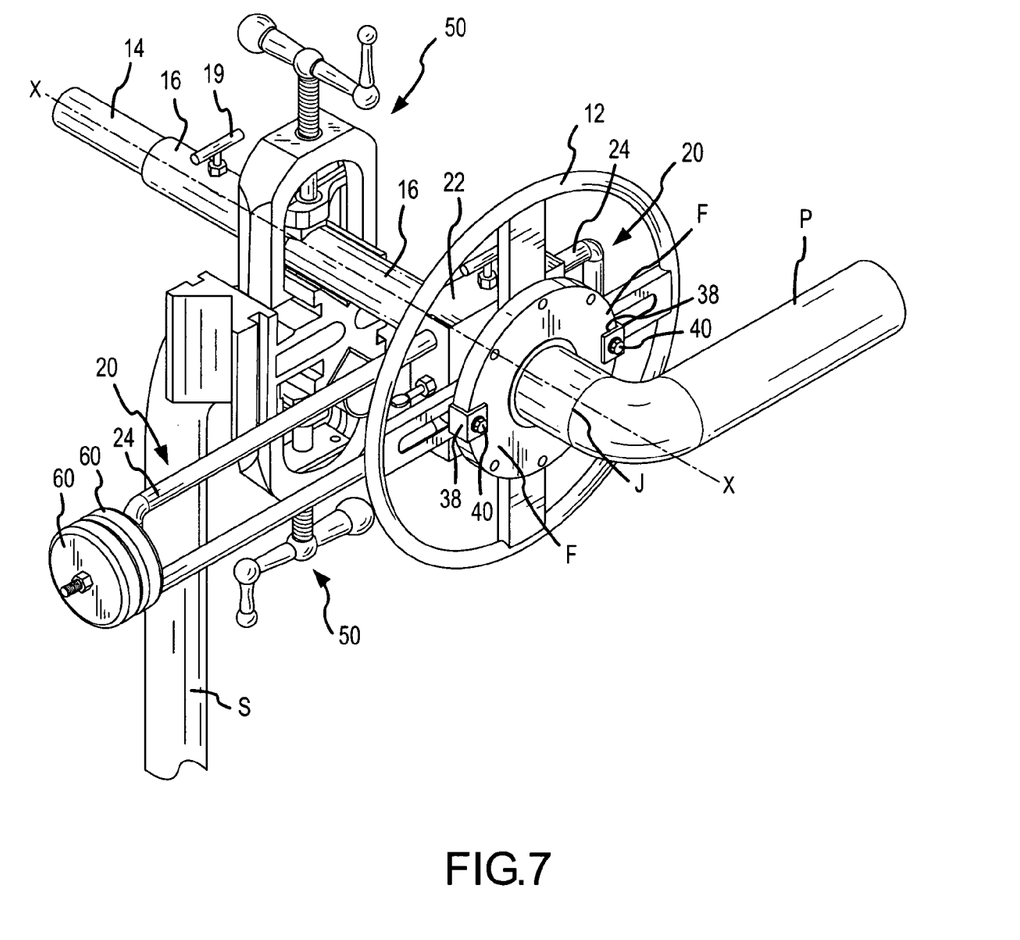
FIG. 7 is a perspective view showing a flange mounted to the spinner tool.

FIG. 7 illustrates a section of pipe P having a flange F that is mounted to the wheel 12. Brackets 38 are shifted in their corresponding slots so that the brackets contact the outer edge of the flange, and the securing bolts 40 are then placed through the bolt holes in the flange F thereby securing the flange to the wheel. As also shown in FIG. 7, the counterweight 24 has been further shifted to accommodate the necessary counterweight to counterbalance the offset in the pipe P. An additional weight 60 is also shown as being added to the slidable counterweight.

Figure 8:
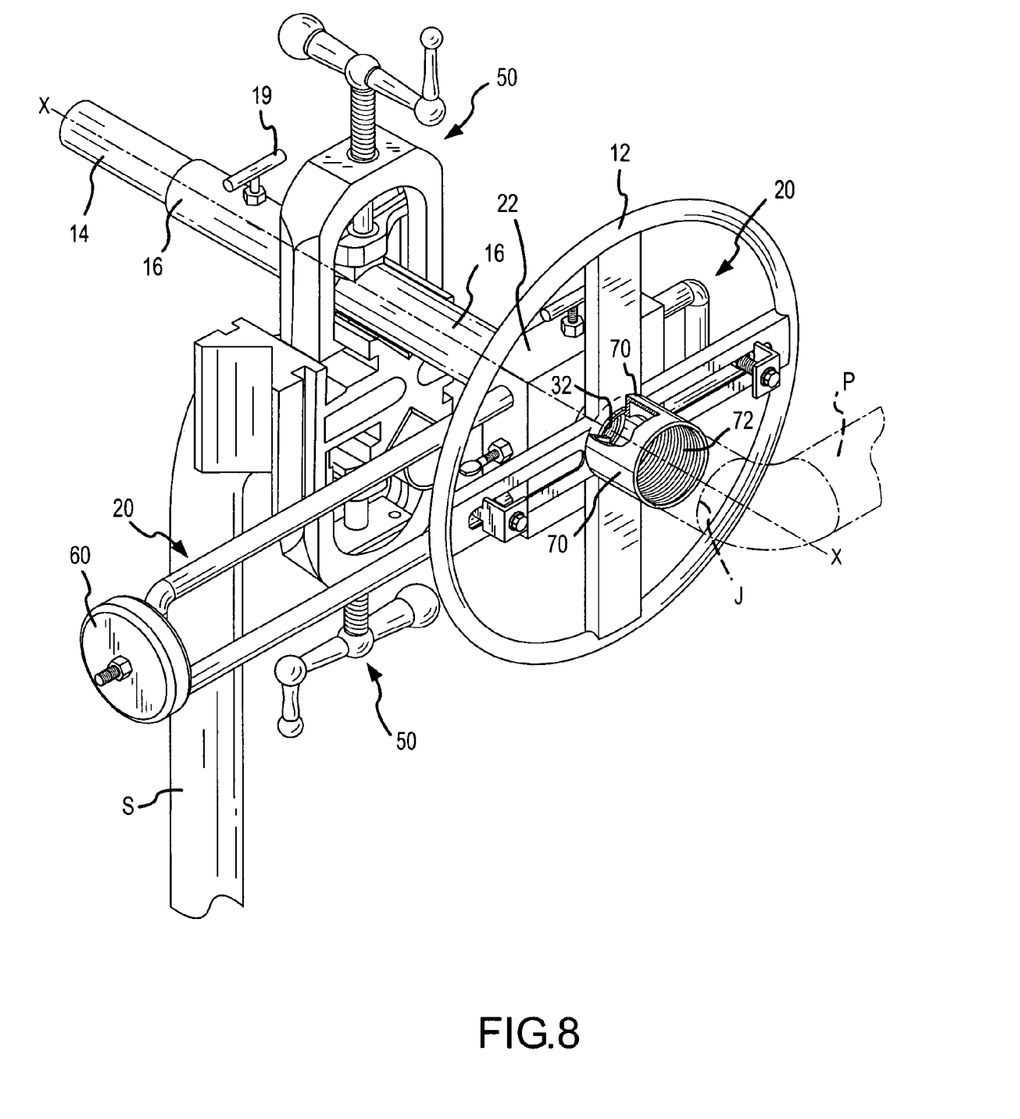
FIG. 8 is another perspective view illustrating a bushing used as an intermediate connecting element allowing the spinner tool to connect to any desired size of pipe.

FIG. 8 illustrates the use of an optional bushing 70 that may be used as an intermediate connecting member for attaching odd sizes of pipe that do not have ends to match the threads in well 32. Bushing 70 has a set of internal threads 72 sized to match the particular diameter of pipe P. The opposite end of the bushing 70 has an extension that is threadably received in well 32. The bushing 70 is shown broken away in FIG. 8 to better show how the bushing is secured.

There are many advantages of the counterbalance assembly of the present invention. The counterbalance assembly is easily mounted to a spinner tool to provide a necessary amount of counterweight allowing a welder to safely and efficiently rotate a pipe for welding. The spinner tool itself is easily mounted to a portable vise directly at the work site, thereby eliminating extra work required to transport pipe to the work site after it has been welded. The spinner tool is especially adapted for receiving various sizes of pipe and pipe flanges. Even with quite heavy and bulky sections of pipe, it is unnecessary for a welder to have a helper to steady the pipe as it is being welded. Accordingly, a welder can independently manipulate quite heavy sections of pipe thereby increasing the work output of the welder.

Another advantage of the counterweight assembly of the present invention is that it is mounted to the device which rotates the workpiece, as opposed to the counterweight being directly attached to the section of pipe being welded. Many jobs require a welder to repeat the same type of weld on similar sized pipe sections. Thus, once the counterweight assembly has been adjusted to provide the desired counterweight, subsequent pieces of pipe having the same configuration can be welded without further adjustment of the counterweight assembly. With a first point of adjustment, the counterweight assembly may be angularly oriented with the section of pipe to be welded, and with a second point of adjustment, the amount of counterweight can be adjusted thereby balancing the load of the pipe.

The present invention has been described with respect to a preferred embodiment; however, various changes and modifications may be made to the preferred embodiment that fall within the scope of the invention as claimed.

What is claimed is:

1. A counterweight apparatus especially adapted for use in combination with a spinner tool, with respect to which a rotatable workpiece to be welded is longitudinally co-axially mounted, for balancing an off-axis portion of said rotatable workpiece, said assembly comprising:
   a) a frame member removably securable to said spinner tool;
   b) a counterweight positioning assembly slidably engaged by said frame member permitting said counterweight assembly to be moved transversely with respect to a common longitudinal axis of said spinner tool and workpiece;
   c) a releasable locking member incorporated on said frame member for permitting the position of the counterweight to be transversely adjusted with respect to the frame, to counterbalance the weight of said off-axis portion of said workpiece;
   d) said counterweight positioning assembly including a pair of substantially parallel, spaced and connected counterweight members that are received in said frame and slidable for said transverse adjustment therein;
   e) said frame includes a releasable locking member permitting angular adjustment of the orientation of said frame with respect to said workpiece so that said counterweight members are generally parallel to the axis of said off-axis portion of said rotatable workpiece.

2. An apparatus, as claimed in claim 1, further including:
at least one weight element secured to said counterweight positioning assembly thereby providing additional capability for counterbalancing the workpiece.

3. An apparatus, as claimed in claim 1, wherein:
said spinner tool includes a rotatable support member and said frame member has a central opening formed theretbrough enabling said frame member to be mounted to said spinner tool ratable support member and the longitudinal axis of said spinner tool is coaxial with said rotatably mounted workpiece.

4. An apparatus, as claimed in claim 1, wherein:
said counterweight positioning assembly members comprise a rectangular tubing framework that slides in bores in said frame permitting said adjustment of the position of the counterweight assembly with respect to the frame.

5. An apparatus, as claimed in claim 1, wherein:
said releasable locking member for adjusting an angular orientation of said frame comprises a set screw-type locking pin.

6. An apparatus as in claim 4 which further includes:
an outer tubular sleeve having a longitudinal axis;
a support member having a longitudinal axis, said support member is mounted coaxially within said sleeve and has a portion extending beyond at least one end of said tubular sleeve;
spaced bearing members mounted between said sleeve and said support member enabling rotation of said support member within said outer sleeve;
a handle attached to said extending portion of said support member; workpiece retaining member secured to said extending portion of said support member for receiving and securing a workpiece for rotation of said workpiece about an axis that is coaxial with said support member axis; and
said counterweight frame is angularly adjustably attached to said support member, so that said workpiece is smoothly rotatable about said axis upon transverse adjustment of the position of said counterweight positioning assembly in said frame.

7. An apparatus, as claimed in claim 6, wherein:
said handle is in the form of a wheel having a plurality of spokes, and two of said spokes including respective channels formed therein.

8. An apparatus, as claimed in claim 6, wherein said handle is in the form of a wheel having a plurality of spokes and said workpiece retaining member for receiving end securing a workpiece is selected from at least one of:
   a) a threaded well for threadably receiving said workpiece or a workpiece holding bushing member; and
   b) at least two of said wheel spokes are disposed on opposite sides of said support member and each spoke includes a channel formed therein, and a pair of brackets cooperating with said channels and adjustable therein to contact and secure said workpiece.

9. An apparatus, as claimed in claim 8, wherein:
said threaded well includes a plurality of threaded sections having differing diameters.

10. A method of securing a workpiece to an apparatus for balanced rotation of the workpiece about an axis during welding of the workpiece, said method comprising the steps of:
providing a spinning tool having a rotatable support, and means incorporated on the tool for securing the workpiece;
providing a counterweight assembly attached to the spinner tool, said counterweight assembly includes a frame, a counterweight attached to the frame, and means incorporated on the frame for adjusting a linear nosition of the counterweight with respect to the frame thereby adjusting a magnitude of force for counterbalancing an offset of the workpiece:
attaching the workpiece to the tool;
angularly orienting the counterweight assembly to counterbalance an offset of the workpiece;
adjusting the counterweight assembly to provide a necessary amount of counterweight to counterbalance an offset load of the workpiece; and
rotating the rotatable support about the axis, the workpiece being balanced by said counterweight assembly.

11. A method, as claimed in claim 10, further including the steps of: removing the workpiece, and attaching a subsequent workpiece to the device having a similar configuration as the first workpiece, wherein the subsequent workpiece is balanced for rotation about the axis without further required adjustment of the counterweight assembly.

12. An apparatus, as claimed in claim 7, wherein said wheel is secured to said workpiece retaining member.

* * * * *